Patented Apr. 22, 1941

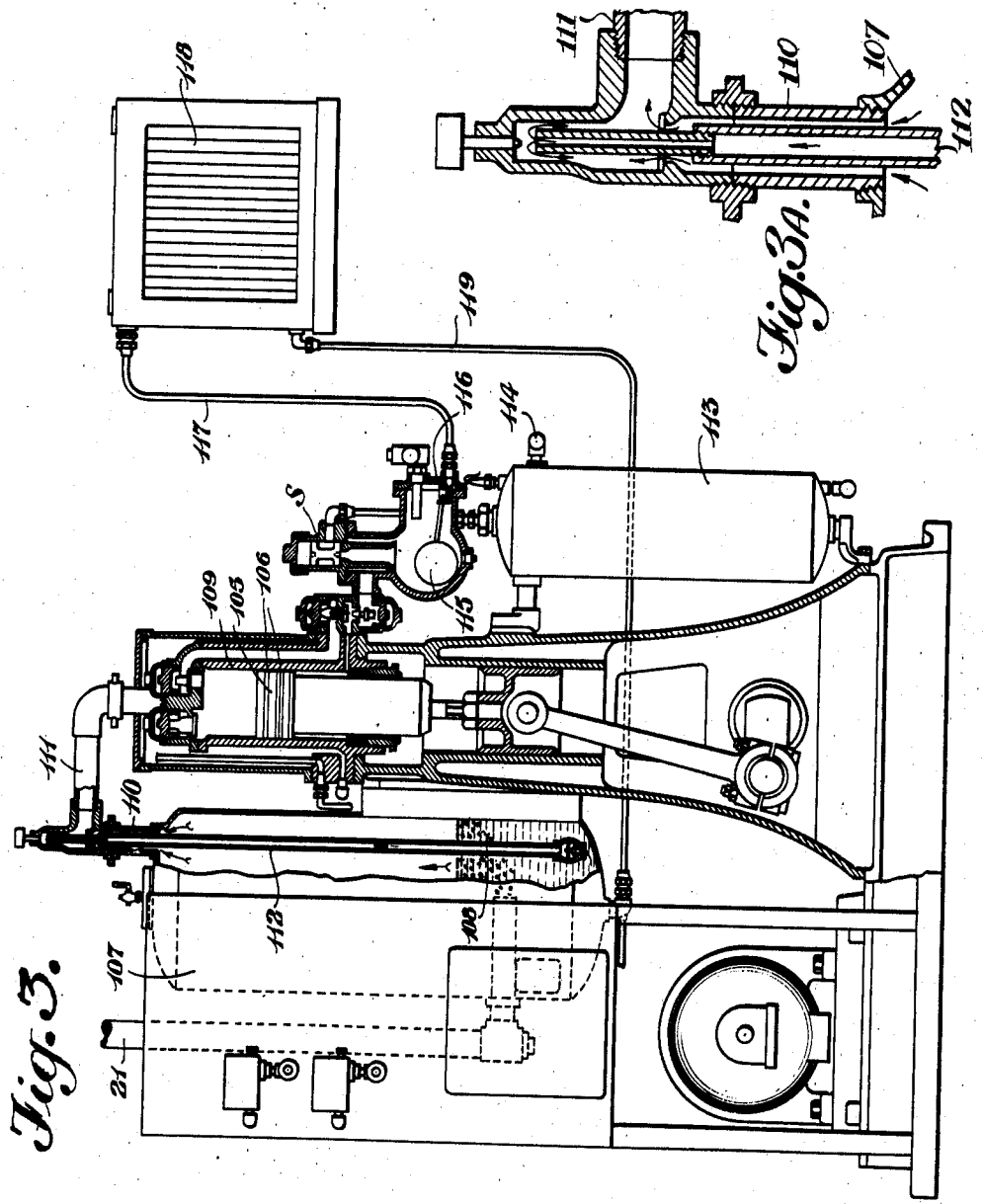

2,239,485

UNITED STATES PATENT OFFICE 2,239,485

REFRIGERATION APPARATUS

Louis De Markus, Blawnox, and Leon Buehler, Jr., Waynesboro, Pa., assignors to Frick Company, Waynesboro, Pa., a corporation of Pennsylvania Application October 26, 1938, Serial No. 237,100

10 Claims. (Cl. 62—122)

This invention relates to the brewing of beer and more particularly to the treatment of carbon dioxide evolved during the beer fermentation process, and the storage of the said carbon dioxide in both its gaseous and liquid phases.

In the treatment of beer between the time of processing in the brew kettle and the moment the beer reaches the consumer's glass, if the beer if to be of high quality having desirable characteristics, it is essential that quantities of carbon dioxide gas, having predetermined characteristics, be available for use in connection with the beer during this interim.

While it is desirable that air come in contact with the beer at certain times, for example during the beginning of fermentation whereby oxidation takes place hastening the propagation of the yeast and accelerating the decomposition of fermentable sugar into carbon dioxide gas and alcohol, and at the time beer is dispensed from a faucet or the mouth of a bottle into a glass whereby the mixture of air with the beer creates a proper foam-head and brings out the choicest aromas, yet it is generally to the benefit of the quality of the beer if it be protected from improper oxidation, which protection may be effected by proper treatment with carbon dioxide of predetermined characteristics, as will later be described.

During the fermentation process, the carbon dioxide gas generated expels surplus air from the beer and protects it from further deleterious air contacts by blanketing the beer surface with this inert and antiseptic gas. Further, as uniformity of foam is highly desirable especially in connection with packaged beer as in cans or bottles, the absence of air and the presence of carbon dioxide of the proper characteristics maintain uniformity in the conservation, or preservation, of the ingredients and the carbonation of the beer and therefore indirectly facilitate uniform foam formation and consistent foam retention of the beer in all bottles or cans so treated, for the character of the foam depends primarily upon the nature and condition of the ingredients of the beer.

It has been found in practice that not only is it essential that the beer be treated with mere carbon dioxide, but, that the carbon dioxide used for the treatment be unaltered with regard to the volatiles that fermentation gas contains. In the carbonation of the beer, in the transferring of the beer to various points of processing, and in the filling of containers with the newly brewed beer, it is essential that carbon dioxide gas and not air be utilized. In the carbonation of the beer, carbon dioxide gas having unaltered volatiles will make for a better beer than if carbon dioxide gas having altered volatiles is so utilized. It is not so important in the transferring of beer from one place to another that as much attention be paid to the volatile content of the carbon dioxide gas used for this purpose just as long as air is excluded. For example, in the filling of containers with beer, a beer of superior excellence will reach the consumer if the container, before it is filled, is exhausted of air by substituting carbon dioxide gas before the container is filled.

Prior to the instant invention, air has been used for effecting transportation of the beer from one place to another and filling operations on the theory that the air is in contact with the beer for so short a time that a measurable deleterious effect does not occur. This theory, however, is fallacious for it has been shown that a beer of superior taste, and character capable of greater shelf life will result if carbon dioxide is used for this purpose. Also prior to this invention no provisions had been made for storing carbon dioxide in sufficient quantities to provide for its porper use to effect a beer packaged in kegs, bottles, or cans which is more appealing to the palate, more delicate in aroma, having a consistent foam-head, a pasteurization taste which is least noticeable, a beer which can better stand the abuses of transportation, the various temperatures of storage, and consequently a much longer, uniform shelf life.

It is an object of the invention to provide a novel system for the collection and storage of carbon dioxide gas evolved during a beer fermentation process.

It is a further object of the invention to provide a system for the collection and storage of carbon dioxide in both its liquid and gaseous phases, having a minimum of altered volatiles.

Other objects and the nature and advantages of the invention will be apparent from the following description taken in conjunction with the accompanying drawings, wherein:

Fig. 3 is a view partly in elevation and partly in section of a "wet" type compressor and its auxiliaries as used in the system as illustrated in Fig. 1; and Fig. 3A is a sectional detail view of the upper portion of Fig. 3 showing the chamber wherein the carbon dioxide gas and water are mixed prior to their ultimate compression.

Figure 1:
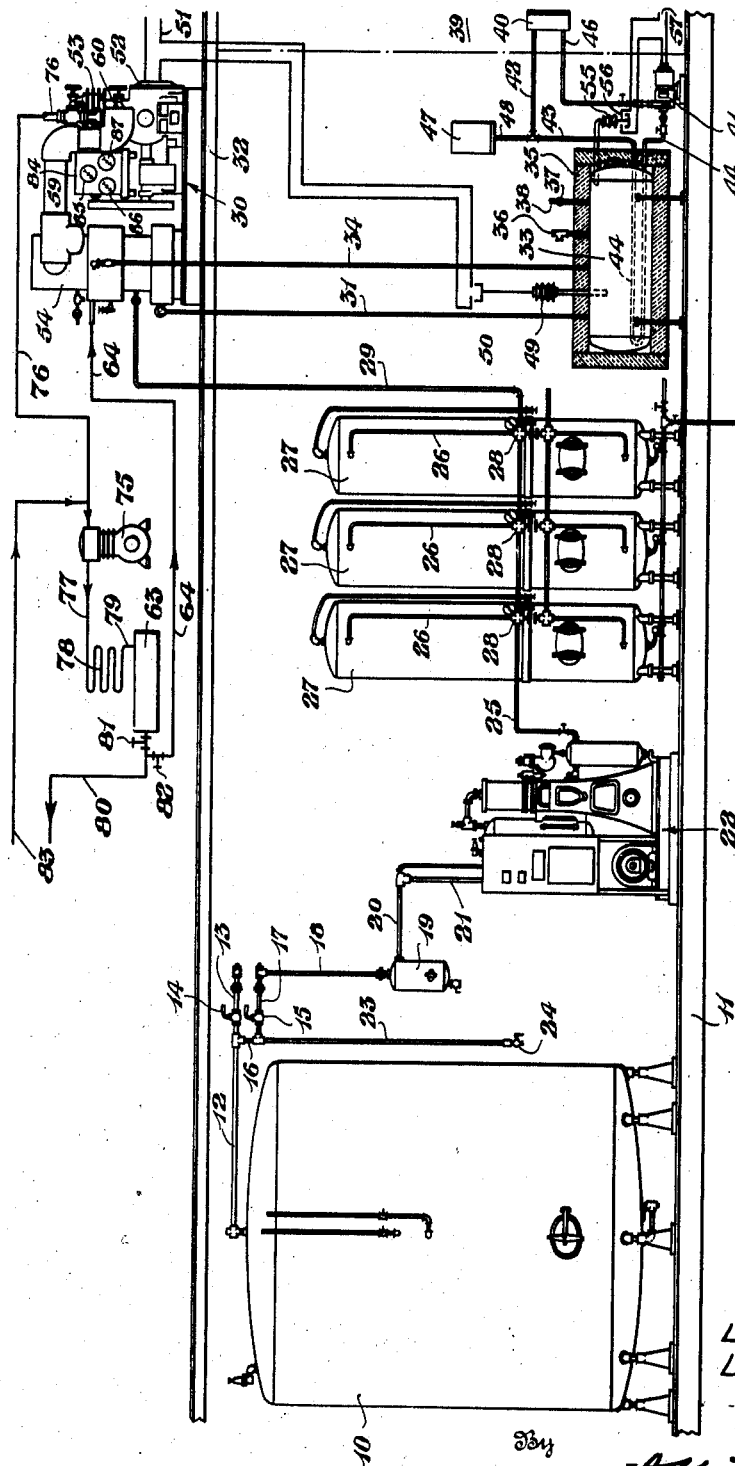
Fig. 1 is a diagrammatic view of a system for the collection and storage of fermentation gas.

Referring to the drawings, and particularly to Fig. 1, a closed beer fermenting tank 10 is arranged on the brewery floor 11. By means of the conduit 12 leading from the upper wall of the fermenting tank 10, carbon dioxide gas evolved during the fermenting process may be exhausted to the atmosphere through the connecting conduit 13 when the valve 14 is open. With the valve 15 open, however, and the valve 14 closed, the evolved carbon dioxide may be drawn through the conduits 16, 17, 18 through the foam trap 19 and thence through conduits 20 and 21 to the carbon dioxide gas compressor 22. Associated which the conduits 16 and 12 leading from the fermentation tank 10 is the conduit 23, the lower portion of which is controlled by the valve 24 which may be used for sampling the gas whereby it may be ascertained whether or not the gas is in proper condition for use as intended.

From the carbon dioxide compressor 22, which will be described in detail later, the gas at a pressure of approximately from 225 pounds to 250 pounds per square inch is passed through the conduits 25 and 26 to the storage tanks 27, wherein the carbon dioxide is stored in a gaseous phase. The three-way valves 28 may permit communication between the conduit 25, the conduits 26, and the conduit 29, or simply between the conduit 25 and conduit 29, the passages to the conduits 26 being shut off. With this arrangement, carbon dioxide gas at a pressure of approximately from 225 to 250 pounds may be passed either to the storage tanks 27 and the conduit 29, or all the compressed gaseous carbon dioxide may be passed through the conduit 29 to the exclusion of the tanks 27 to the condenser 30, which will be described later in more detail, and which is mounted on the floor 32 above the level of the floor 11, wherein the carbon dioxide gas is translated to its liquid form and by gravity is passed through the conduit 31 to the storage tank 33, arranged on the floor 11 and in which storage tank the carbon dioxide is stored in its liquid condition. The equalizing conduit 34 connects the portion of the condenser 30 above the liquid level therein with the upper portion of the liquid storage tank 33 about which is placed the insulation 35 in order to retard the flow of heat from the ambient about the storage tank thereinto. As a precaution, a valved relief conduit 36 may be provided in the upper portion of the storage tank 33. Also leading from the upper portion of the storage tank 33 the conduit 37 controlled by valve 38 permits the leading of stored carbon dioxide gas to a place of use.

Located within a cold storage room 39, or other room from which it is desired to remove heat, is the heat absorber 40 which may comprise a finned coil or equivalent heat exchanger through which a suitable heat exchange solution is adapted to be circulated by the motor pump 41 which draws relatively warm heat exchange solution, say at a temperature of 32 to 36° F. through the conduit 42, the conduit 43, the harpin coil 44 located within the liquid carbon dioxide stored in the storage tank 33, through conduit 45, motor pump 41, and through conduit 46 back to the heat absorber 40 to complete the cycle. The hairpin coil 44 serves to discharge heat from the heat exchange solution passing through it which has received heat from the heat absorber 40 to the liquid carbon dioxide converting it from a liquid phase to a gaseous phase, in which gaseous phase it may be passed through the conduit 37 controlled by valve 38 to a place of use. A surge tank 47 connected to the conduits 42 and 43 by a conduit 48 allows for expansion and contraction of the heat exchange medium, which may comprise ethyl alcohol, ethyl alcohol and water, or other brine.

In order to provide a supply of carbon dioxide gas, whenever gas is desired, a pressure responsive device 49 is arranged in association with the interior of the storage tank 33 and with the switch 50 in the circuit 51 of the electric motor 52 which drives the compressor 53 which in turn serves to withdraw evaporated ammonia from the evaporator type heat exchanger 54 of the condensing apparatus 30, whereby when the carbon dioxide pressure within the storage tank 33 has dropped to say 175 pounds, the switch 50 will be open and the suction effect of the compressor 53 caused to stop. When the pressure within the storage tank 33 reaches say 225 or 250 pounds, the switch 50 will be closed and the operation of the compressor 53 begun.

Should the carbon dioxide gas be withdrawn from the conduit 37 faster than the carbon dioxide will boil off from the liquid within the storage tank 33 by reason of the heat leakage thereto from the ambient through the insulation 35, then operation of the fluid pump 41 will be effected and warm brine will be passed through the hairpin coil 44, warming the carbon dioxide liquid, evaporating a portion thereof and increasing the pressure in the storage tank 33. This operation is effected by the pressurestat 55 associated with the interior of the storage tank 33 and the switch 56 in the circuit 57 of the motor pump 41 in a manner such that when the pressure in the storage tank 33 is at or below 125 pounds, the switch 56 will be closed and operation of the motor pump 41 initiated; and when a pressure of 150 pounds within the storage tank 33 is reached, the switch 56 will be opened and operation of the motor pump 41 will cease. Though this arrangement effectively supplies heat to the carbon dioxide in liquid phase within the storage tank 33, it is to be understood that it is within the scope of the invention to utilize any other heating means for this purpose, such as, for example, a steam heating coil or an electric resistance coil.

Figure 2:
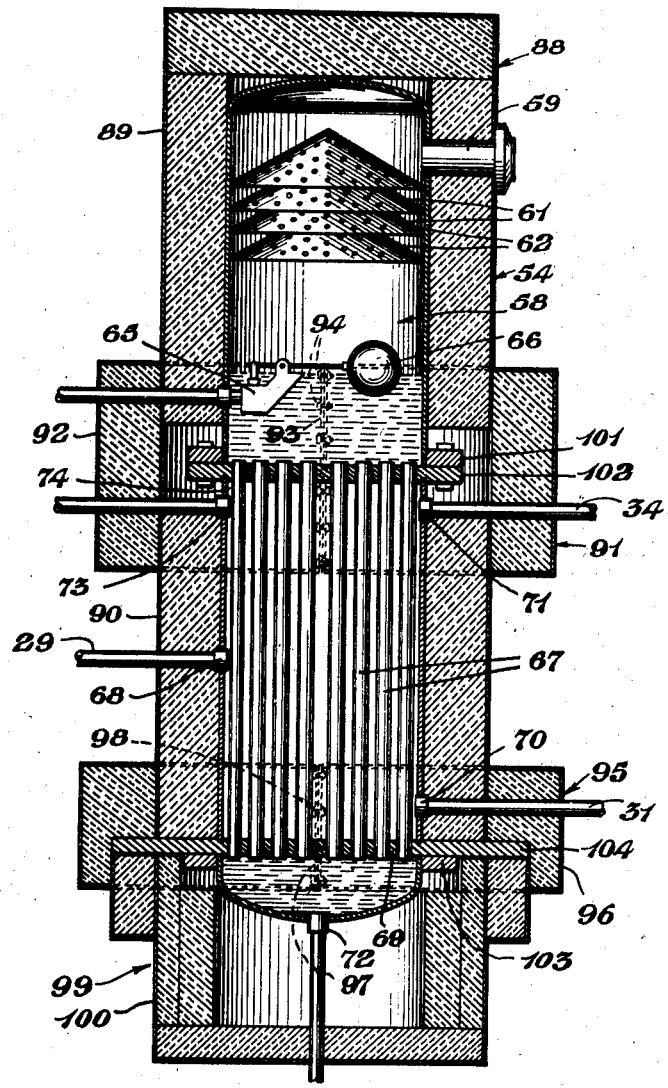
Fig. 2 is a vertical sectional view of an evaporator-condenser.

The compressor 53 of the condensing apparatus 30 serves to withdraw gasified ammonia refrigerant from the space 58, see Fig. 2, within the heat exchanger 54 through the conduit 59 to its suction inlet 60. The baffles 61 which are perforated, as by the series of small holes 62, serve to trap and return liquid particles which may be entrained in the ammonia refrigerant gas being withdrawn by the suction effect of the compressor 53.

Associated with the liquid ammonia receiver 63 of the brewery main refrigeration plant is a liquid conduit 64 which conveys liquid refrigerant to the valve 65 controlled by the float 66 which in turn operates to permit the inflow of liquid ammonia to the space 58 when the level therein is below a predetermined point and to shut off the supply of liquid ammonia when the level is above a predetermined point. The ammonia liquid will fill the tubes 67 and gaseous carbon dioxide entering the inlet 68 of the heat exchanger 54 will pass about the exterior of tubes 67, become chilled and condense over the plate 69 whereby condensed liquid carbon dioxide may drain into the conduit 31 through the carbon dioxide outlet 70.

The upper portion of the equalizing conduit 34 may be associated with the equalizing connection 71 and an oil drain connection 72 may be provided in the lower portion of the ammonia space 58 of the heat exchanger 54. In addition, a purge connection 73, as illustrated in Fig. 2, may be associated with the carbon dioxide space 74 of the heat exchanger 54.

Ammonia refrigerant vapor withdrawn from the ammonia space within the heat exchanger 54 of the condensing apparatus 30 is withdrawn through the conduit 59 to the suction inlet 60 of the low pressure ammonia compressor 53 wherein the ammonia vapor is compressed to a pressure corresponding to the suction pressure of the main compressor 75 of the brewery refrigeration system. A conduit 76 is associated with the discharge side of the low pressure compressor 53 and serves to lead ammonia refrigerant vapor from the low pressure compressor to the suction side of the main ammonia compressor 75 wherein the refrigerant is compressed to a condensing temperature and passed through conduit 77, which leads to ammonia condenser 78 from whence the liquid ammonia is passed through conduit 79 to the receiver 63. From the ammonia receiver 63 liquid ammonia may be passed to the brewery refrigeration coils, not shown, by means of the conduit 80 controlled by the valve 81, and, similarly, liquid ammonia may be passed through the conduit 64 controlled by valve 82 to the heat exchanger 54 as already described. Ammonia refrigerant vapor evaporated in the brewery refrigeration coils is returned to the brewery ammonia compressor through the conduit 83, which is open to the conduit 76 leading to the suction side of the main ammonia compressor 75.

Located on the panel 84 associated with the conditioning apparatus 30 are the gauges 85, 86, and 87, which indicate the carbon dioxide pressure, the ammonia pressure within the space 58 and the pressure of the ammonia as discharged by the low pressure compressor 53, respectively.

To retard the inflow of heat from the ambient about the evaporator heat exchanger 54, the insulation 88 is provided which includes the fixed cylindrical portions 89 and 90, and the removable cylindrical portion 91 which is removably secured to the evaporator heat exchanger 54 by the strap 92 having flanged ends 93 is held together by bolts 94. Similarly, the removable cylindrical insulating portion 95 of the insulation 88 is held to the lower portion of the evaporator heat exchanger 54 by the strap 96, having flanged ends 97 secured together by bolts 98. The bottom insulating portion 99 of the insulation 88 may comprise a cylindrical casing 100 housing insulating material such as rock wool, granulated or molded cork, or other suitable equivalent material. The insulation 88 may be of cork, molded to fit and longitudinally split in halves or it may comprise lagging of insulating strip cut on a taper so that when assembled, a hollow cylinder is formed. The insulation may be laid in hot asphalt and wires or narrow metal bands may be tied about it.

With the arrangement described, by unfastening the bolts 94, and removing the cylinder 91, the flanges 101 and 102 are rendered accessible for service whenever necessary which facilitates the cleaning of the tubes or their replacement in case of failure or for any other purpose. Similarly, removal of the insulating portion 95 permits access to the flanges 103 and 104. The rings or flanges 103 and 104 are utilized to better effect an autogeneous seal or other suitable joint.

The carbon dioxide compression apparatus 22, see Fig. 3 and Fig. 3A, is of a type which permits of operation without the use of the usual lubricants, the piston 105 being fitted with pump leathers 106 as is sometimes incorporated in water pumps and hand bicycle tire pumps, for example. The carbon dioxide gas evolved during fermentation is taken into the tank 107 through the conduit 21 where it comes into direct contact with the water 108 and passes to the compression cylinder 109 by means of the conduits 110 and 111 together with a spray of water under pressure effected by the carbon dioxide gas, which water must pass through the elongated tube 112 before it is mixed with the gas in the conduit 111. The water within the cylinder 109 acts as a lubricant and also keeps the temperature of the carbon dioxide gas from rising to any considerable extent during the compression process.

This feature prevents the rise in temperature of the carbon dioxide which is compressed, to an objectionably high level and keeps the same below the pasteurization temperature of beer, thereby serving to maintain the compressed fermentation gas in a desirable and proper condition for use in connection with carbonation, etc., by reason of the fact that the relatively low temperature of the gas at this stage prevents the altering of the volatiles, which are inherent therein, to a minimum. The use of a dry compressor which was indirectly cooled would not effect this result, for even if the gas is permitted to rise in temperature for only a relatively small period of time, yet this rise will be enough to alter the volatiles of the fermentation gas in a manner which will render beer contacting same relatively unpalatable and effect a marked decrease in quality as compared to beer effecting the same contact with compressed fermentation gas as described in connection with the invention.

Further, the use of the water as a lubricant prevents the contact of the gas with the conventional oil lubricants whereby the foam characteristics of the beer contacting the fermentation gas will be desirable and give a rich foam when the beer, treated with the oil free gas, is poured from a keg, bottle, or can into the consumer's glass. In practice it has been found when beer had contact with fermentation gas compressed in a compressor utilizing an oil lubricant, the foam characteristics were undesirable, the beer appearing flat when poured or otherwise dispensed from a keg, bottle, or can to a glass. Hence, it will be understood that the water as utilized in the compression apparatus 22 effects a dual purpose; first, it serves to cool the compressed gas by direct intimate contact therewith; and second, the water serves as a lubricant for the compressor piston whereby the necessity for deleterious oil lubricant is obviated.

The compressed fermentation gas is discharged at a pressure from 225 to 250 pounds into the separator S wherein the water falls to the bottom of same and the compressed fermentation gas is led to the tank 113, from which it may pass through the outlet 114 into the conduit 25 and the storage tanks 27 and 33. The relatively warm water upon reaching a certain level within the separator S will cause the float 115 to rise and open the valve 116 which the float controls, to permit the relatively warm water to pass through the conduit 117 to the heat radiator 118 which may take the form of any conventional heat exchanger and which is located in a cold storage room which is normally maintained at a temperature of about from 32° to 36° F., such as the room 39, for example, see Fig. 1. Water cooled in the heat radiator 118 will then pass from the bottom thereof through the conduit 119 and be returned to the tank 107 to complete the water cycle.

It will be seen from the above that provision has been made for the collection of fermentation gas in both its liquid and gaseous phases and in a condition with a minimum of altered volatiles and oil free, whereby desired foam characteristics of the finished beer will be inherent in the same. During the fermentation cycle the gas evolved is not always constant in its nature; that is, the gas first given off is different from gas given off during the middle of the cycle or the latter part thereof. It may be desirable, for example, to utilize the fermentation gas given off during the middle of the cycle for carbonation and the gas evolved during the first and latter parts of the cycle for the conveyance of the beer from one place to another and during the filling operations. Accordingly, during the first portion of the fermentation cycle, gas may be collected in the storage tanks 27. During the middle portion of the fermentation cycle the valves 28 may be so turned that the conduits 26 no longer communicate with the conduit 25, which now directly communicates exclusively with the conduit 29 whereby the gas will be condensed by the condensing apparatus 30 and conducted by conduit 31 to the storage chamber 33 where it may be kept in a liquid phase. During the latter part of the fermentation cycle the evolved gas may again be passed to and stored within the storage chamber 27, as described. With this arrangement the most efficient use of the fermented gas is effected and results in a beer of superior quality by reason of being carbonated with a fermentation gas which is oil free in order that the foam characteristics of the finished beer be as desired, and which has a minimum of altered volatiles therein whereby the taste, flavor and aroma of the beer may be all that can be desired by a beer connoisseur.

Not only does the system described permit of flexibility of operation and the production of a superior beer, but the initial cost of installation is relatively small in comparison with other installations from which an inferior result is effected, and further the space occupied is likewise relatively small in comparison with that necessarily taken up by prior systems.

As the fermentation process is not necessarily continuous in a given brewery and as deliveries may be continuous, the transferring of the beer and the filling of the same into portable receptacles, as well as the carbonation, may require a continuous supply from which carbon dioxide gas may be drawn. Accordingly, in prior systems a great number of storage chambers 27 was required, which entailed a great initial expenditure for installation and in addition a great amount of space wherein the storage chambers might be housed. The liquefaction of the fermentation gas as described requires an apparatus which is relatively small in volume, low in first cost in comparison to the cost of the number of storage chambers similar to the storage chambers 27 which were previously described.

The instant invention not only provides for the mere liquefaction of the carbon dioxide gas in order to conserve storage space, but involves an apparatus whereby the fermentation gas may be condensed at a temperature not higher than that corresponding to 250 pounds carbon dioxide pressure, whereby the desirable volatiles inherent in the gas will remain substantially unaltered.

As the pasteurization of beer requires the application of a temperature which is considerably higher than that which corresponds to 250 pounds carbon dioxide pressure, it will be readily understood that applicants' apparatus is capable of producing and economically storing a fermentation gas retaining a maximum of desired volatiles whereas in the conventional brewery refrigeration equipment, with an ammonia evaporating temperature of from 30 to 36° F., a much greater compression than the 250 pounds suggested here would be necessary, with the possibility of exceeding the pasteurization temperature of beer during the compression and injuring the volatile matter in the gas.

It will be obvious to those skilled in the art that various changes may be made in this device without departing from the spirit of the invention and therefore the invention is not limited to what is shown in the drawings and described in the specification but only as indicated in the appended claims.

We claim:

1. In an apparatus for collecting and storing fermentation gas and incorporating a refrigeration system of the compressor-condenser-expander type, a fermentation tank, a compressor, conduit means for leading fermentation gas from said tank to the suction side of said compressor, means for contacting water with said gas within the compressor to cool and wash said gas and to lubricate said compressor, a storage chamber for storing compressed fermentation gas in a gaseous phase, conduit means for passing said cooled, washed, and compressed gas to said storage chamber, a fermentation gas condenser, conduit means for passing some of said cooled, washed, and compressed fermentation gas to said condenser, a refrigerant evaporator in heat exchange relation with said condenser, a low pressure compressor for withdrawing gaseous refrigerant from said evaporator, a high pressure compressor for receiving refrigerant gas compressed by said low pressure compressor, conduit means connecting the discharge of said low pressure compressor with the suction of said high pressure compressor, a refrigerant condenser, conduit means connecting said high pressure compressor with said refrigerant condenser, means for connecting said condenser with said refrigerant evaporator, an insulated storage tank wherein fermentation gas in a liquid phase may be stored, and means for conducting fermentation gas in a liquid phase, as it is condensed by said condenser, to the insulated storage tank.

2. In an apparatus for collecting and storing fermentation gas, a fermentation tank, means for compressing gas evolved in said tank, means for passing water in direct contact with said gas prior to its compression to its maximum pressure whereby said gas will be cooled and washed, means for effecting condensation of some of said compressed fermentation gas at a relatively low temperature, said last mentioned means comprising a refrigeration system utilizing a volatile refrigerant, a refrigerant evaporator and a condenser, and insulated storage means for storing fermentation gas in a liquid phase.

3. In an apparatus for collecting and storing fermentation gas, a fermentation tank, means for compressing gas evolved in said tank, means for passing water in direct contact with said gas prior to its compression to its maximum pressure whereby said gas will be washed and cooled, means for condensing some of said compressed fermentation gas, said last mentioned means comprising a refrigerant evaporator and means for withdrawing refrigerant vapor from said evaporator at a pressure and temperature of not more than that which corresponds to saturation temperature of the compressed fermentation gas, and insulated storage means for storing fermentation gas in a liquid phase.

4. In an apparatus for collecting and storing fermentation gas, a fermentation tank, means for compressing gas evolved in said tank, means for passing water in direct contact with said gas prior to its compression to its maximum pressure whereby said gas will be washed and cooled, means for condensing some of said compressed fermentation gas, said last mentioned means comprising a refrigerant evaporator and means for withdrawing refrigerant vapor from said evaporator at a pressure and temperature of not more than that which corresponds to saturation temperature of the compressed fermentation gas, insulated storage means for storing fermentation gas in a liquid phase, and means for evaporating said liquid to a gaseous phase for use in that state.

5. In an apparatus for collecting and storing fermentation gas, a fermentation tank, means for compressing gas evolved in said tank, means for passing water in direct contact with said gas prior to its compression to its maximum pressure whereby said gas is cooled and washed, means for effecting condensation of some of said cooled, washed, and compressed fermentation gas at a relatively low temperature, insulated storage means for storing fermentation gas in a liquid phase, means for evaporating said liquefied fermentation gas and at the same time cooling a storage room comprising a heat absorber and a heat conductor, said heat absorber being located in the space to be cooled and said heat conductor being located in heat exchange relation with the interior of said insulated storage tank, conduit means connecting said heat absorber and said heat conductor in a closed cycle, and means for passing a heat transfer medium through said conduit means whereby heat from said space to be cooled will be transferred to said stored liquid fermentation gas whereby it may be evaporated to a gaseous phase and utilized in that phase.

6. In an apparatus for collecting and storing fermentation gas, a fermentation tank, means for compressing gas evolved in said tank to a pressure of not more than 275 pounds per square inch absolute, means for passing water in direct contact with said gas prior to its compression to its maximum pressure whereby said gas will be washed and cooled, means for condensing some of said compressed fermentation gas, said last mentioned means comprising a refrigerant evaporator and means for withdrawing refrigerant vapor from said evaporator at a pressure and temperature of not more than that which corresponds to saturation temperature of the compressed fermentation gas, insulated storage means for storing fermentation gas in a liquid phase, means for evaporating said liquefied fermentation gas and at the same time cooling a storage room comprising a heat absorber and a heat conductor, said heat absorber being located in the space to be cooled and said heat conductor being located in heat exchange relation with the interior of said insulated storage tank, conduit means connecting said heat absorber and said heat conductor in a closed cycle, and means for passing a heat transfer medium through said conduit means whereby heat from said space to be cooled will be transferred to said stored liquefied fermentation gas whereby it may be evaporated to a gaseous phase and utilized in that phase.

7. A combined evaporator condenser comprising a cylindrical body portion having a vertical axis and closed at its top and bottom, an evaporated refrigerant outlet located near the upper portion of said cylinder, a baffle located adjacent said outlet whereby liquid refrigerant entrained in refrigerant vapor being withdrawn from the apparatus will be returned to the lower portion of same, a plurality of horizontally disposed plates engaging vertical walls of the apparatus and forming with said walls a space for gas to be condensed, a plurality of tubes passing through said plates and through said space, a float control liquid refrigerant inlet valve located above the level of said tubes and entirely within the walls of the cylinder whereby liquid refrigerant will fill the said tubes when the apparatus is in operation, a gas inlet connection for the space between the said two plates, and a liquid drain connection for the space formed by the said two plates, the walls of the cylinder, and the exterior of the said tubes.

8. The process of collecting and storing fermentation gas comprising, evolving fermentation gas in a fermentation tank, compressing said evolved gas at a temperature not exceeding the pasteurization temperature of beer, cooling and washing said gas during its compression, and condensing said cooled, washed and compressed gas at a temperature and pressure corresponding to not more than the pasteurization temperature of beer.

9. The process of collecting and storing gas evolved during the fermentation of beer comprising, evolving fermentation gas in a fermentation tank, compressing said evolved gas, cooling and washing said gas during its compression, effecting condensation of said cooled, washed, and compressed gas at a relatively low temperature, and evaporating said liquefied gas in accordance with the demand for said gas.

10. In an apparatus for collecting and storing fermentation gas, a fermentation tank, means for compressing gas evolved in said tank, means for passing water in direct contact with said gas prior to its compression to its maximum pressure whereby said gas will be cooled and washed, means for condensing some of said fermentation gas, insulated storage means for storing fermentation gas in a liquid phase, heating means for evaporating said liquid fermentation gas, means actuated by the pressure of said fermentation gas in said storage means for placing said condensing means into operation whenever said pressure exceeds a set value, and means actuated by the pressure of the fermentation gas in said storage means for placing said heating means into operation whenever said pressure is below a set value, said second set value being lower than said first set value.

LOUIS DE MARKUS.
LEON BUEHLER, Jr.